United States Patent [19]

Hatazaki

[11] Patent Number: 5,671,329

[45] Date of Patent: Sep. 23, 1997

[54] SPEECH DIALOGUE SYSTEM IN WHICH A RECOGNITION AND UNDERSTANDING PROCESS, APPLICATION PROCESS, AND VOICE INPUT RESPONSE ARE PERFORMED SIMULTANEOUSLY WITH VOICE INPUT

[75] Inventor: Kaichiro Hatazaki, Tokyo, Japan

[73] Assignee: NEC Corporation, Tokyo, Japan

[21] Appl. No.: 207,266

[22] Filed: Mar. 9, 1994

[30] Foreign Application Priority Data

Mar. 9, 1993 [JP] Japan ................................ 5-048085

[51] Int. Cl.$^6$ ........................................................ G10L 5/06
[52] U.S. Cl. ...................... 395/2.62; 395/2.57; 395/2.86
[58] Field of Search ........................... 395/11, 12, 2.66, 395/2.57, 2.62, 2.86, 2.79, 2.84, 209; 364/419.08, 419.17

[56] References Cited

U.S. PATENT DOCUMENTS

| 4,974,191 | 11/1990 | Amirghodsi et al. | 364/418.08 |
|---|---|---|---|
| 5,027,406 | 6/1991 | Roberts et al. | 381/43 |
| 5,357,596 | 10/1994 | Takebayashi et al. | 395/2.84 |
| 5,390,279 | 2/1995 | Strong | 395/2 |
| 5,457,768 | 10/1995 | Tsuboi et al. | 395/2.4 |

OTHER PUBLICATIONS

Noisy spontaneos speech understanding using noise immunity keyword spotting with adaptive speech response cancellation, Takebayashi et al, 1993 international conference on Acoustics, Speech, and Signal processing, (ICASSP 93), pp. 115–118 vol. 2 Apr. 1993.

A real time connected word recognition system Ishikawa et al., Proceedings, 10th international conference on pattern recognition, pp. 215–217 vol. 2 Jun. 1990.

An experimental speech–tospeech dialog translation system, Kitano et al., Computer vol. 24 Iss 6, pp. 36–50 Jun. 1991.

Real–time task–oriented speech understanding system using keyword spotting, Proceedings of 1992 International Conference on Acoustics, Speech, and Signal Processing (ICASSP 92), Tsuboi et al., pp. 197–200 Mar. 1992.

Primary Examiner—Allen R. MacDonald
Assistant Examiner—Richemond Dorvil
Attorney, Agent, or Firm—Foley & Lardner

[57] ABSTRACT

A speech dialogues system comprises a voice analyzing portion converting a voice input signal into a time series feature vector, a voice detecting portion detecting the leading end and the trailing end of a voice period in the voice input signal on the basis of the time series feature vector, a recognition and understanding portion translating the time series feature vector into a meaning expression per each voice period, an input dividing portion dividing the meaning expression string into partial strings respectively aggregated in meaning and outputting each partial strings, and an application executing portion for performing corresponding application process for each partial string of the meaning expressions.

16 Claims, 10 Drawing Sheets

SPEECH DIALOGUE SYSTEM IN WHICH A RECOGNITION AND UNDERSTANDING PROCESS, APPLICATION PROCESS, AND VOICE INPUT RESPONSE ARE PERFORMED SIMULTANEOUSLY WITH VOICE INPUT

BACKGROUND OF THE INVENTION

1. Field of the Invention

The present invention relates to a speech dialogues system and processing method therefor, for interactive operation by a voice input for buying or making reservation of an airplane ticket, a train ticket or a hotel, for example. More specifically, the invention relates to a speech dialogues system with enhanced conversational ability between a user and the system.

2. Description of the Related Art

Voice is one of most natural and easily used man-machine interface for interaction with a system, such as a computer system. It has been desired to realize a speech dialogues system, with which a user may achieve his object, such as buying of a ticket, by interaction with a computer by voice input.

Conventional speech dialogues system has been discussed in "*Development of Speaker Independent Speech Dialogues System TOSBURG*", Paper of Acoustic Science of Japan, March, 1992, Pages 135 to 136. The above-identified publication discloses a system, in which one phrase completed in the meaning is taken as voice input, after voice input of one phrase, word retrial, grammatic meaning analysis (recognition and understanding), application process and voice response are performed, and repeating the foregoing process, the process is progressed in a dialogues manner.

However, in such a conventional speech dialogues interface, the following problems may be arisen so that the interface cannot be easily used by the user.

At first, until one phrase of voice input is completed, the system will not make any display or voice response so that a user may not confirm the result of recognition and understanding. Therefore, only after completion of input, the user may appreciate an error in recognition and understanding of the word. In such case, it is frequently required to input the whole phrase again. This clearly degrades a task achievement.

Secondly, when a user makes an input for one or two clauses (or words) while considering the content of speech, one or several clauses are taken as one phrase to cause voice output as response messages at every input of one or several clauses. Therefore, though the result of recognition and understanding in the system can be confirmed, the user should be interrupted from consideration of the speech and voice input.

In particular, upon an object directed dialogues system, such as for buying of an airplane ticket or train ticket or making a reservation for a hotel room, it should be natural and often occur that the user makes a voice input as a small segment of a phrase with consideration of a content of a display and/or response given by the system, rather than making a voice input in series for a relatively long phrase. In such a case, when the application process in the system is executed per every one or several words to make the voice response, the user has to wait for completion of the application process and the voice response output, which clearly interrupts his or her consideration and/or voice input.

SUMMARY OF THE INVENTION

In view of the inconvenience in the prior art system, an object of the present invention is to provide a speech dialogues system which, instead of performing recognition and understanding and application process at every one phrase of voice input by a user, can progress recognition and understanding, application process and voice response in parallel to speech of a user to provide enhanced conversational ability and smoothness for achieving high task achievement.

Another object of the present invention is to provide a speech dialogues system which can perform recognition and understanding, application process and response simultaneously with speech of the user by controlling execution of the application process depending upon a length of pause period inserted between respective clauses upon the voice input by the user, and whereby capability and smoothness of conversation between the user and the system is provided.

According to a first aspect of the invention, a speech dialogues system comprises:

voice analyzing means for converting a voice input signal into a time series feature vector;

voice detecting means for detecting the leading end and the trailing end of a voice period in the voice input signal on the basis of the time series feature vector;

recognition and understanding means for translating the time series feature vector into a meaning expression per each voice period;

input dividing means for dividing the meaning expression string into partial strings respectively aggregated in meaning and outputting each partial strings; and application executing means for performing corresponding application process for each partial string of the meaning expressions.

In this case, the processes in the voice analyzing means and the recognition and understanding means are performed simultaneously with voice input.

On the other hand, the application executing means may mutually distinct first and second processes for mutually different process content with respect to the partial string of the meaning expressions input from the input dividing means;

the application executing means may be responsive to the partial string of the meaning expressions to execute the first process for the received partial string of the meaning expression;

when next partial string of the meaning expressions may not input upon completion of the first process, the application executing means executes the second process for the currently processed partial string;

when next partial string of the meaning expressions may be input during execution of the second process, the application executing means interrupts execution of the second process and executes the first process for the next partial string.

The speech dialogues system may further comprise recognition and understanding result display means receiving the meaning expression in time series and displaying the received meaning expression from time to time.

The application executing means may have the first process which has a relatively short process period and a second process which takes a relatively long period.

According to a second aspect of the invention, a speech dialogues system comprises:

voice analyzing means for converting a voice input signal into a time series feature vector;

voice detecting means for detecting the leading end and the trailing end of a voice period in the voice input signal on the basis of the time series feature vector;

recognition and understanding means for translating the time series feature vector into a meaning expression per each voice period;

input dividing means for dividing the meaning expression string into partial strings respectively aggregated in meaning and outputting each partial strings; and application executing means for performing corresponding application process for each partial string of the meaning expressions, the voice detecting means outputting a leading end detection signal to the application executing means when the leading end of the voice period is detected; and the application executing means having mutually distinct first and second processes for mutually different process content with respect to the partial string of the meaning expressions input from the input dividing means, the application executing means is responsive to the leading end detection signal input during execution of the first process for the currently processed partial sting; and when the leading end detection signal is input during execution of the second process, the application executing means interrupts execution of the second process and executes the first process for the next partial string.

The application executing means may have the first process which has a relatively short process period and a second process which takes a relatively long period. Also, the speech dialogues system may include a recognition and understanding result display means receiving the meaning expression in time series and displaying the received meaning expression from time to time.

According to the third aspect of the invention, a speech dialogues system comprises:

voice analyzing means for converting a voice input signal into a time series feature vector;

voice detecting means for detecting the leading end and the trailing end of a voice period in the voice input signal on the basis of the time series feature vector;

recognition and understanding means for translating the time series feature vector into a meaning expression per each voice period;

input dividing means for dividing the meaning expression string into partial strings respectively aggregated in meaning and outputting each partial strings; and application executing means for performing corresponding application process for each partial string of the meaning expressions, the voice detection signal outputting a trailing end detection signal to the input dividing means when the trailing end of the voice period is detected; and the input dividing means outputting the meaning expressions accumulated before input of the trailing end detection signal upon reception of the trailing end detection signal as the partial string aggregated in meaning.

In the preferred construction, not limitative, the application executing means has mutually distinct first and second processes for mutually different process content with respect to the partial string of the meaning expressions input from the input dividing means;

the application executing means is responsive to the partial string of the meaning expressions to execute the first process for the received partial string of the meaning expression;

when next partial string of the meaning expressions is not input upon completion of the first process, the application executing means executes the second process for the currently processed partial string;

when next partial string of the meaning expressions is input during execution of the second process, the application executing means interrupts execution of the second process and executes the first process for the next partial string.

Furthermore, the speech dialogues system may further comprise recognition and understanding result display means receiving the meaning expression in time series and displaying the received meaning expression from time to time.

According to the fourth aspect of the invention, a speech dialogeustic processing method comprises the steps of:

converting a voice input signal into a time series feature vector;

detecting the leading end and the trailing end of a voice period in the voice input signal on the basis of the time series feature vector;

translating the time series feature vector into a meaning expression per each voice period;

dividing the meaning expression string into partial strings respectively aggregated in meaning and outputting each partial strings; and performing corresponding application process for each partial string of the meaning expressions.

In this case, it is preferred that the step of performing application process includes mutually distinct first and second processes for mutually different process content with respect to the partial string of the meaning expressions input;

the application executing step is responsive to the partial string of the meaning expressions to execute the first process for the received partial string of the meaning expression;

when next partial string of the meaning expressions is not input upon completion of the first process, the application executing step executes the second process for the currently processed partial string;

when next partial string of the meaning expressions is input during execution of the second process, the application executing step interrupts execution of the second process and executes the first process for the next partial string.

According to the fifth aspect of the invention, a speech dialogeustic processing method comprises the steps of:

converting a voice input signal into a time series feature vector;

detecting the leading end and the trailing end of a voice period in the voice input signal on the basis of the time series feature vector;

translating the time series feature vector into a meaning expression per each voice period;

dividing the meaning expression string into partial strings respectively aggregated in meaning and outputting each partial string; and performing corresponding application process for each partial string of the meaning expressions, outputting a leading end detection signal to the application executing means when the leading end of the voice period is detected; and the application executing step having mutually distinct first and second processes for mutually different process content with respect to the partial string of the meaning expressions input from the input dividing means, the application executing step is responsive to the leading end detection signal input during execution of the first process for the currently processed partial sting; and when the leading end detection signal is input during execution of the second process, the application executing means interrupts execution of the second process and executes the first process for the next partial string.

Preferably, the speech dialogeustic processing method further comprises the steps of:

outputting a trailing end detection signal upon detection of the trailing end of the voice period; and outputting the meaning expressions accumulated before inputting of the trailing end detection signal as the partial string aggregated in the meaning when the trailing end detection signal of the voice period is input.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

Figure 1:
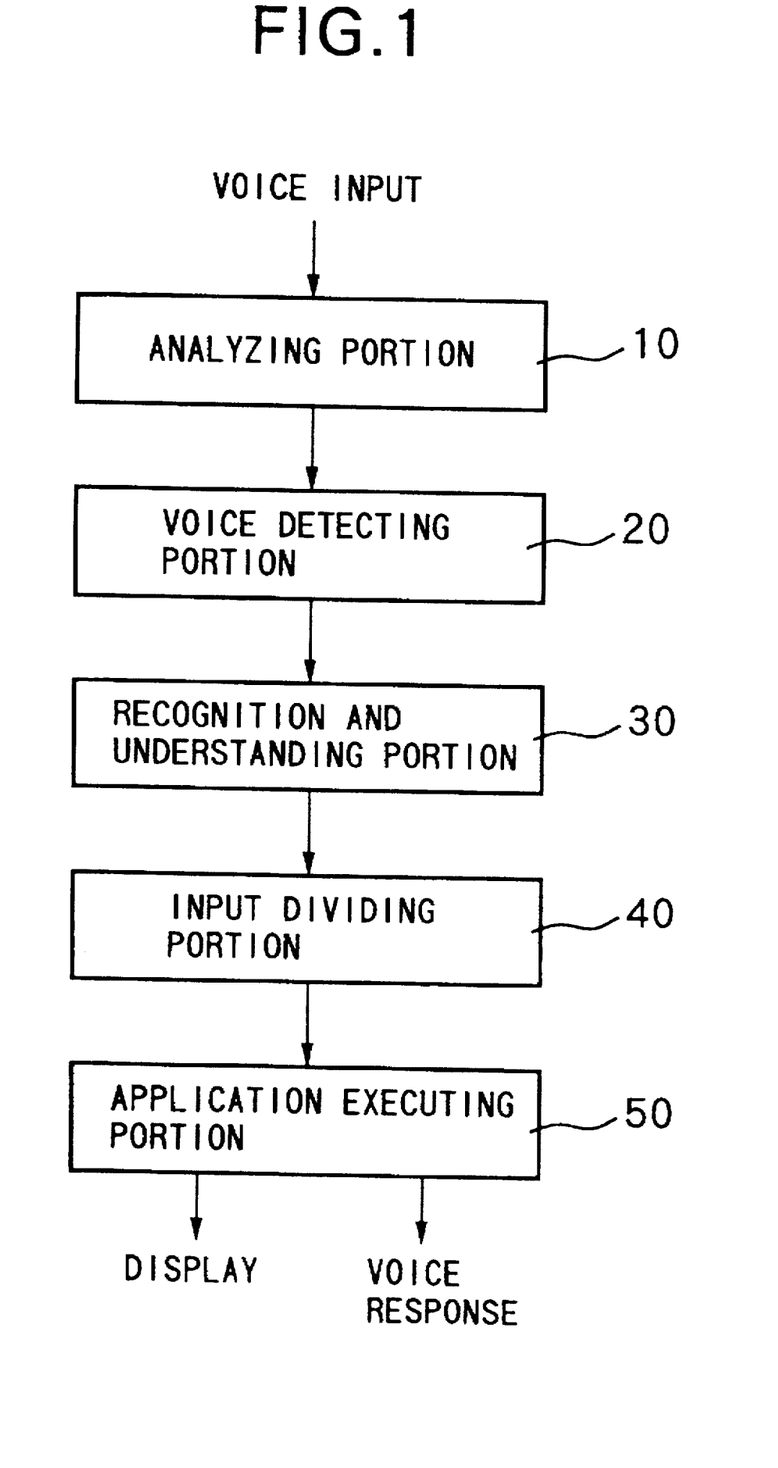
FIG. 1 is a block diagram showing a construction of a preferred embodiment of a speech dialogues system according to the present invention.

The preferred embodiments of a speech dialogues system according to the present invention will be discussed in detail with reference to the accompanying drawings. FIG. 1 is a block diagram showing the preferred embodiment of a speech dialogues system according to the present invention. The shown embodiment of the speech dialogues system includes a voice analyzing portion 10, a voice detecting portion 20, a recognizing and understanding portion 30, an input dividing portion 40, and an application executing portion 50.

The voice analyzing portion 10 makes analysis of an input voice signal and converts it into a time series feature vector. For analysis, a melcepstrum method, LPC (linear prediction) analyzing method or so forth may be employed. The melcepstrum method is discussed in "Digital Speech Processing" by Tokai University Publication Association, Pages 32 to 96, for example. In the melcepstrum method, a signal period is extracted from a digitized input signal, frequency characteristics of each signal period is derived by Fourier transformation, the frequency axis of a derived characteristic amount is converted into a melscale in consideration of acoustic characteristics of the human being, and then, a time series of a feature vector is derived by inverse Fourier transformation. The disclosure of the above-identified Publication is herein incorporated by reference for the sake of disclosure.

The voice detecting portion 20 uses a power information (level or magnitude of input voice) in the time series feature vector received from the voice analyzing portion 10 to detect the leading end and the trailing end of the signal period of the input signal. The method of voice detection as set forth above has been discussed in Yasunaga Niimi: "Voice Recognition", Kyoritsu Shuppan Kabushiki Kaisha, Pages 68 to 70. In practice, a leading end of a period, in which the level of the voice input signal is maintained at a level higher than or equal to a threshold level for a period longer than or equal to a given period, is taken as the leading end position of the voice period. On the other hand, a timing, at which the signal level falls down across the threshold level is taken as the trailing end of the voice period when the level of the voice input signal is maintained lower than or equal to the threshold level for a given period of time. The content of the disclosure of the above-identified publication is herein incorporated by reference for the sake of disclosure.

The leading end and the trailing end of the voice period detected by the voice detecting portion 20 is input to the recognition and understanding portion 30 together with the time series feature vector. The recognition and understanding portion 30 recognizes the time series feature vector between the leading end and the trailing end of the voice period in order to derive a word or word string corresponding to the voice period. On the other hand, the word or word string as the result of recognition is converted in order into a meaning expression indicative of the meaning thereof for outputting the meaning expression.

The respective processes of the foregoing voice analysis, the voice detection and the recognition are performed in synchronism with voice input by the user. Accordingly, even at the intermediate timing of the voice input, a series of meaning expressions is sequentially output from the recognizing portion 30.

In the recognizing portion 30, in order to perform recognition of the word or word sequence based on the sequence of time series feature vectors, the time series vector after the leading end is compared with the preliminarily stored standard patterns of a plurality of words to be subjects of recognition. Then, similarity at respective timing of the voice input signal is performed so that the word or word sequence having the highest similarity is obtained.

Such method is disclosed in Japanese Unexamined Utility Model Publication No. 56-029292, entitled "Continuous Speech Recognition System", for example. In the disclosed system, a grammar expressed by a finite state automaton describing word patterns to be recognized is established, and, then, among the word patterns generated from this grammar, the word pattern having the highest similarity is determined to take this word pattern as the result of recognition. The disclosure of the above-identified publication is herein incorporated by reference for the sake of disclosure.

Alternatively, "HMM Phoneme Recognition and Continuous Speech Recognition Using Expanded LR Gammer Analyzing Method", paper of Information Processing Society of Japan, Vol. No. 31, No. 3, pages 472 to 480 discloses another method. In the disclosed method, connection of word patterns to be recognized is established according to a context-free grammar, the word patterns are connected according to the grammar depending upon the voice input, the similarity of the connected word pattern and the voice input is derived to select the word pattern having the highest similarity as the result of recognition. The disclosure of the above-identified publication is also incorporated by reference for the sake of disclosure.

Additionally, it is also possible to employ a word spotting scheme to sequentially retrieve words in the time series feature vector.

In the recognition and understanding portion 30, as a method for converting the recognized word or word string into the meaning expression, a method proposed in "Speaker Independent Continuous Speech Recognition based on Demi-Syllable Units", The Institute of Electronics, Information and Communication Engineering Technical Report, No. SP90-83, may be applicable, for example. In the disclosed method, a meaning table describing the meaning of words in the grammar and relationship of meaning of the words is preliminarily established, and then the meaning expression is generated by picking-up the word and the relationship of meaning between words in the meaning table with respect to the word in the word string as the result of recognition. The disclosure of the above-identified publication is also herein incorporated by reference for the sake of disclosure.

In the alternative, it is possible not to convert the word or word string into the meaning expression and output the word or word string as a meaning expression.

The meaning expression obtained by the recognizing and understanding portion 20 is sequentially input to the input dividing portion 40. The input dividing portion 40 checks a string of the meaning expression of the received meaning expression. When a partial string of the meaning expression associated in the meaning is obtained, the input dividing portion 40 instantly outputs the partial string of the meaning expression to the application executing portion 50.

To accomplished this, a method can be used, in which a plurality of sets of combinations of the meaning expression complete in the meaning are preliminarily stored, and at a time where one of the set of the meaning expression appears, the corresponding set of the meaning expression is output.

Alternatively, it is possible to employ another method, in which combinations of meaning expressions having low association are preliminarily stored, when two meaning expressions having low association appear sequentially in the string of meaning expression, the border of the periods of the meaning expression is set therebetween to output the partial string of the meaning expression as set forth above.

The application executing portion 50 receives the partial string of the meaning expression from the input dividing portion 40. At the same time, with respect to the partial string of the meaning expression, an application process preliminarily defined for the partial string is executed. Then, the result of execution is displayed or output as a voice output. Here, the application process means may include storing process of the input value and accessing process for a database with respect to the input data, though it is not exhaustive.

The foregoing operations are performed simultaneously with voice input by the user. Therefore, at the timing where the voice to be aggregated in the meaning is input, the meaning expression expressing the meaning at that timing is transferred to the application executing portion 50. Accordingly, in parallel to voice input by the user, the result of process by the application can be displayed or output as the voice output.

Figure 2:
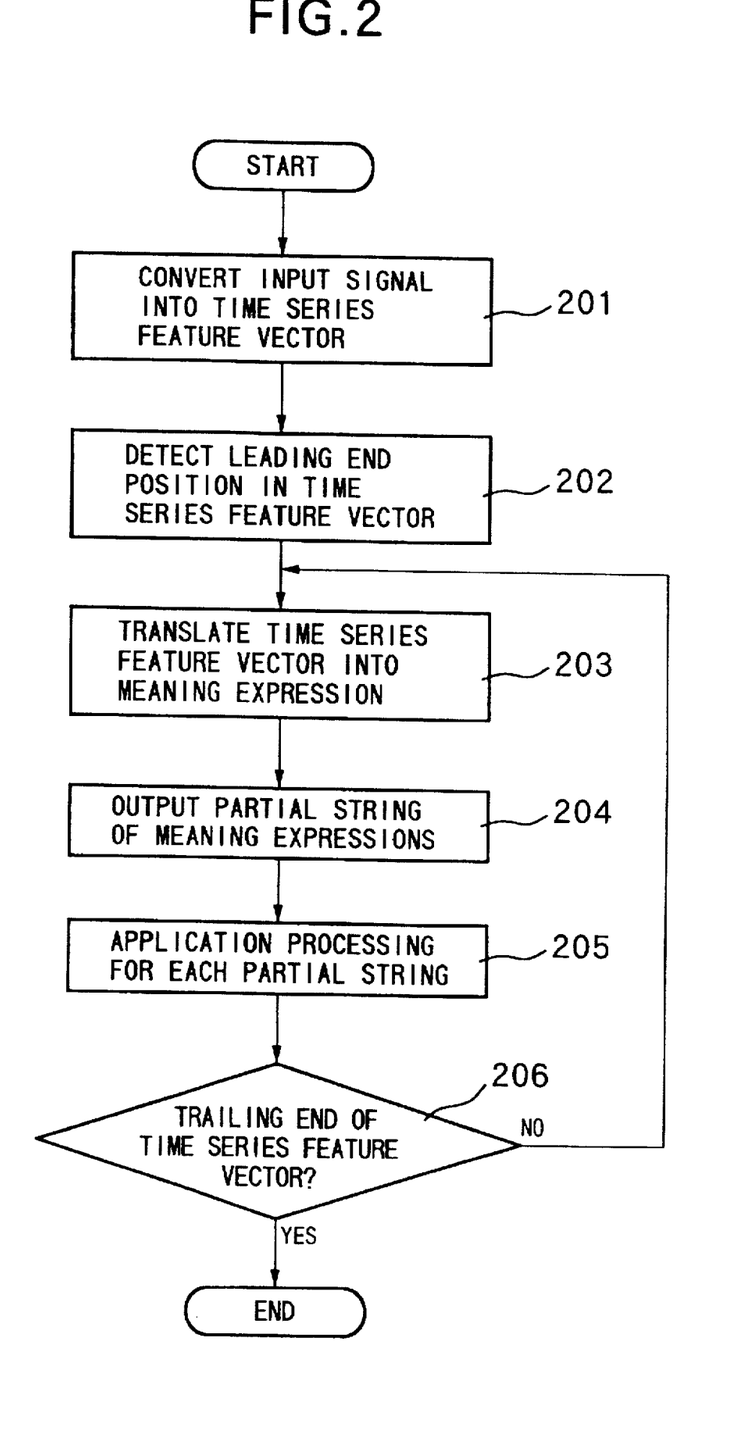
FIG. 2 is a flowchart showing the operation of the preferred embodiment of the speech dialogues system of FIG. 1.

FIG. 2 shows a flowchart showing operation of the above-mentioned preferred embodiment of the speech dialogues system according to the present invention. In FIG. 2, at first, in the voice analyzing portion 10, the input voice is analyzed and converted into the time series feature vector (step 201). Next, in the voice detecting portion 20, the leading end of the time series feature vector is detected (Step 202).

Then, simultaneously with detection of the leading end position of the time series feature vector, the recognition by the recognizing and understanding portion 30 starts recognition process. In the recognizing and understanding portion 30, the time series feature vector is recognized and the word or the word string is obtained as the result of recognition. The word or word string obtained as the result of recognition is then converted into the meaning expression representative of the meaning of the word or words and output is output in time series (step 203). Next, the input dividing portion 40 divides the time series meaning expression fed thereto into partial strings aggregated in the meaning. Then, the divided partial string is output to the application executing portion 50 (step 204).

In the application executing portion 50, the preliminarily defined application process corresponding to the input partial string is executed. Also, upon necessity, the displaying and/or voice response is performed for the result of process (step 205). The foregoing process is repeated until the trailing end of the time sequence of the feature vector is detected (step 205).

The following is the concrete operation of the preferred embodiment of the speech dialogues system according to the present invention.

Here, the following discussion will be given for the application in a system of buying a train ticket using the speech recognition system according to the invention.

Figure 3:
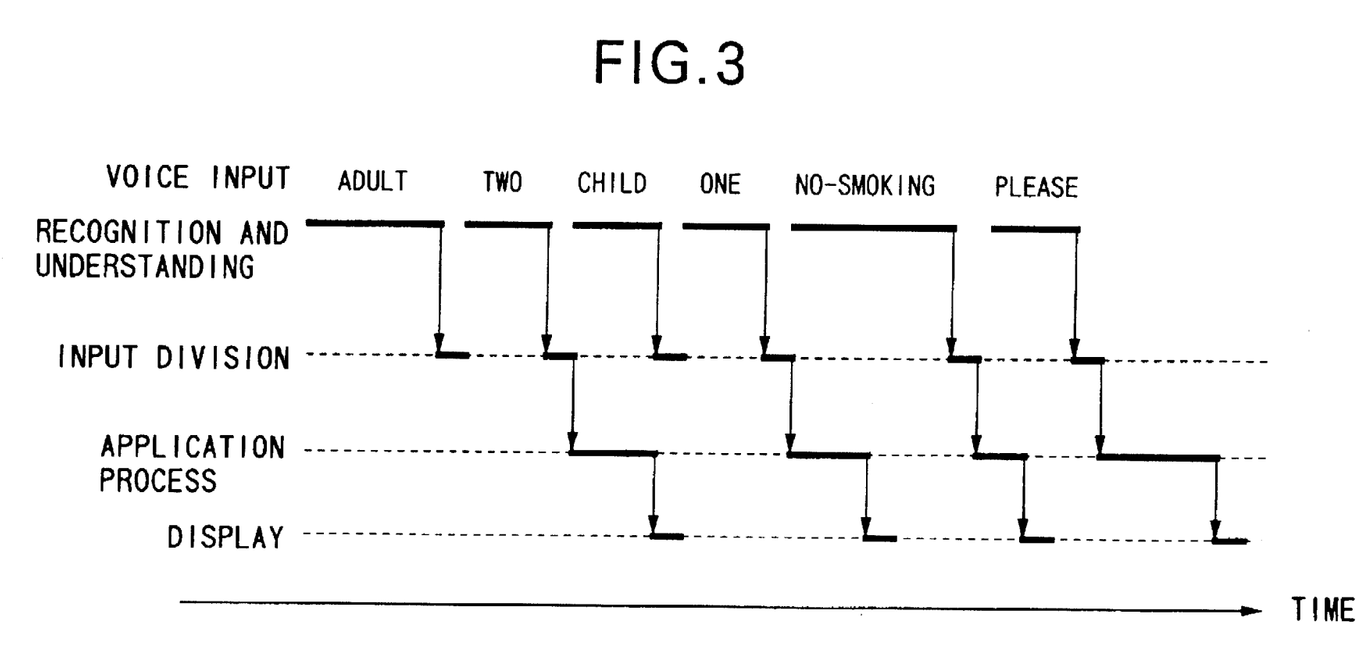
FIG. 3 is a timing chart showing the operation of an application executing portion of the preferred embodiment of the speech dialogues system of FIG. 1.

FIG. 3 shows a timing chart of the concrete operation of the preferred embodiment of the speech recognition system of the invention. It should be appreciated that the portions shown by a thick line represent process at respective portions.

When a user makes an input by speech which corresponds to "two adults and one child for no-smoking seat, please", for example, six meaning expressions "adult" "2", "child", "1", "no-smoking", "request" are sequentially output from the recognizing and understanding portion 30. Then, such meaning expressions are input to the input dividing portion 40.

Subsequently, the input dividing portion 40 checks the string of the received meaning expressions in order. Namely, upon completion of user's voice input for "two adults", the input dividing portion 40 receives the meaning expression "adults" and "2" from the recognizing and understanding portion 30. At the same time, the input dividing portion 40 obtains the combination of "adults" and "2" as a set in the meaning expressing "two adults". Then, the input dividing portion 40 outputs this combination as a partial string to the application executing portion 50.

In the application executing portion 50, when "adult" and "2" are received, it instantly stores the requested item as "ticket for adult" and number of the ticket is "2". At the same time, the result is displayed on the display screen.

During this moment, the user subsequently made voice input for "one child". With respect to this, the similar process is taking place. Namely, in response to sequentially input "child" and "1", the meaning expressions "child" and "1" are input to the input dividing portion 40 from the recognizing and understanding portion 30. The input dividing portion 40 obtains the combination of "child" and "1" as a set in the meaning to output the partial string of the meaning expressions to the application executing portion 50.

The application executing portion 50 instantly responds to the input of "child" and "1" to store the fact that the requested item is "ticket for child" and number is "1". Simultaneously, the application executing portion 50 displays the result on the display screen. Subsequently, the same process are taking place for the words "no-smoking" and "please".

As can be appreciated herefrom, with the preferred embodiment set forth above, by the input dividing portion 40, the meaning expressions (words) fed from the recognizing and understanding portion 30 are combined in the meaning and established as the partial string to be input to the application processing portion 50. Then, application processing and response are performed with respect to each partial string. Accordingly, the recognition and understanding process, application process and response to the voice input can be performed simultaneously with user's speech.

Figure 4:
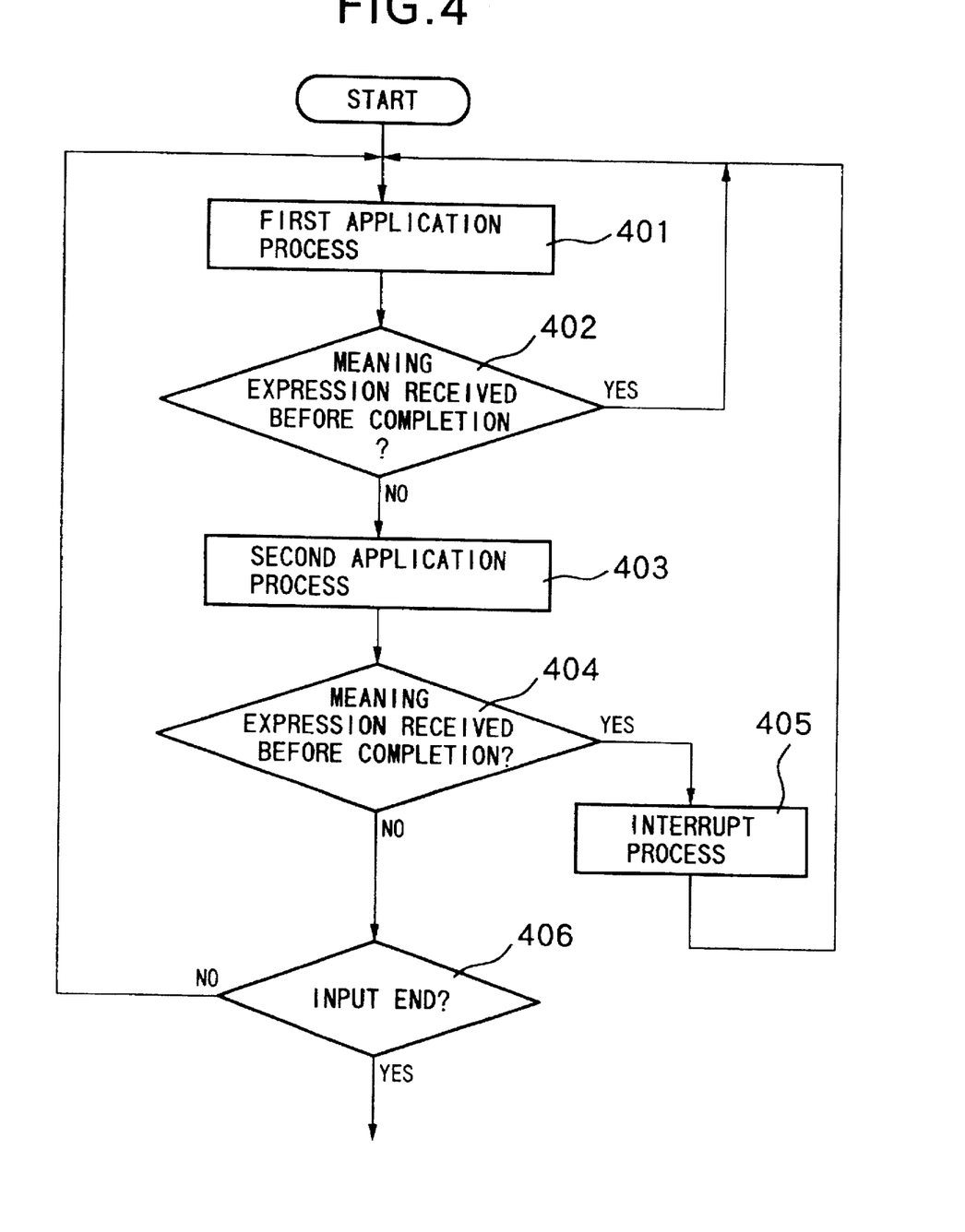
FIG. 4 is a flowchart showing an alternative of the operation of the preferred embodiment of the speech dialogues system of FIG. 1.
Figure 5:
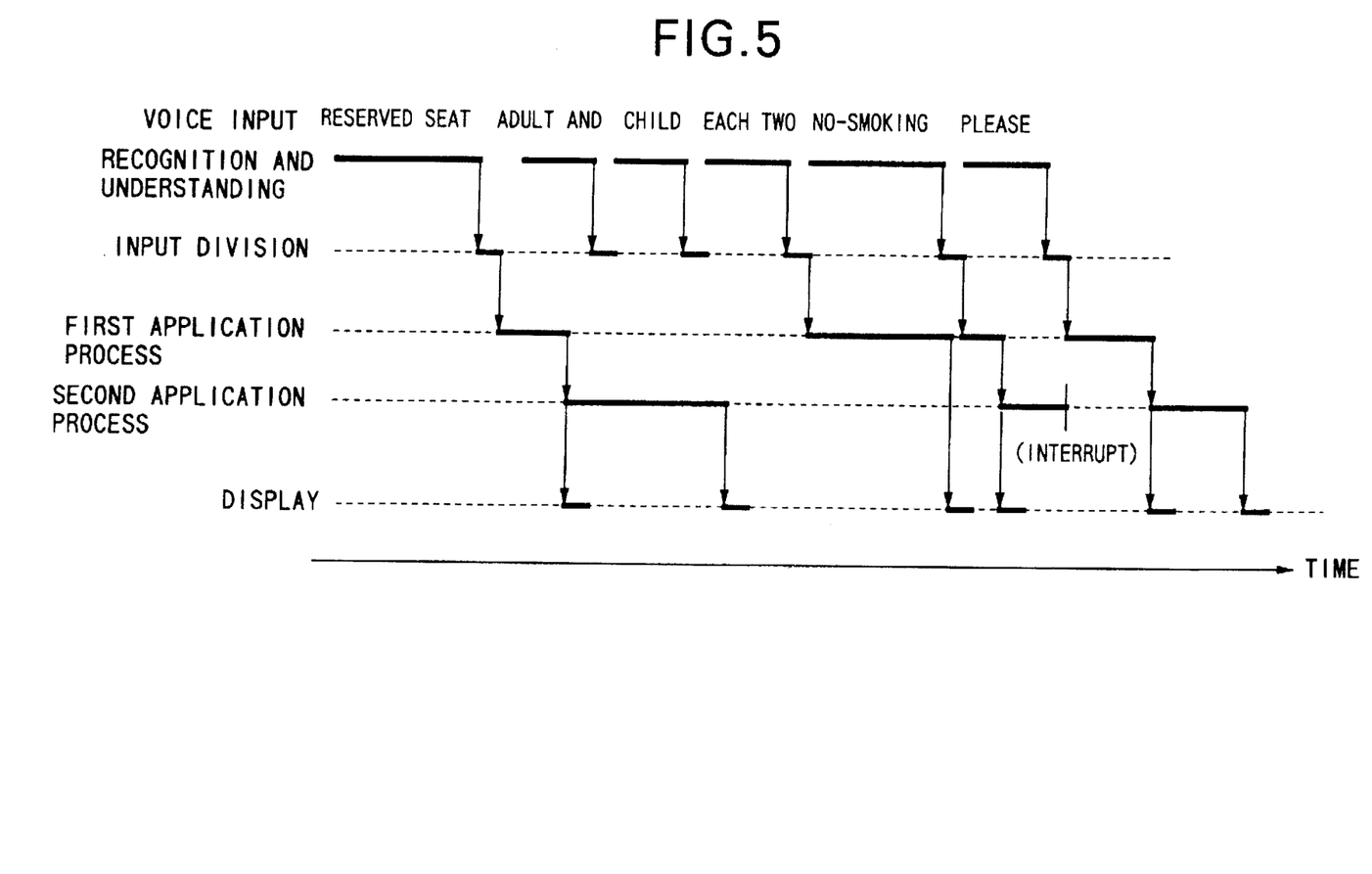
FIG. 5 is a timing chart showing the alternative operation of an application executing portion of the preferred embodiment of the speech dialogues system of FIG. 1.

FIGS. 4 and 5 shows a modification of the preferred process to be executed by the preferred embodiment of the speech dialogues system according to the present invention. In the modification, the application process to be performed in the application executing portion 50 is preliminarily defined as a first process and a second process depending upon the content of the processes. When a set of meaning expression (partial string) is received from the input dividing portion 40, the application executing portion 50 initially executes the first application process. Upon completion of the process, if no next input of the meaning expression is made from the input dividing portion 40, the application executing portion 50 initiates execution of the second application process. On the other hand, when the input dividing portion 40 inputs a next meaning expression upon completion of the first application process, the application processing portion 50 does not execute the second application process. On the other hand, when the next meaning expression is input from the input dividing portion 40 during execution of the second application processing, the execution of the second application processing is instantly interrupted.

The operation in the modified process of the application executing portion 50 is illustrated in FIG. 4 in a form of a flowchart. At first, for the partial string of the meaning expressions fed from the input dividing portion 40, the application executing portion executes the first application process (step 401). Before completion of the first application process, the application executing portion 50 makes a judgement as to whether the next partial string of the meaning expressions is input from the input dividing portion 40 (step 402). If the next partial string is received, the second application process for the currently executed partial string is not performed and the first application process is executed for the next partial string.

When the next partial string of the meaning expressions is not input from the input dividing portion 40 as checked at the step 402 before completion of the current execution of the first application process, the second application process is executed for the currently processed partial string (step 403). Before completion of the second application process for the current partial string, a check is performed as to whether next partial string is received from the input dividing portion 40 (step 404). If input of the next partial string is judged at the step 404, the execution of the second application process is interrupted (step 405), and the first application process is instantly executed. When no next partial string is input from the input dividing portion 40 as checked at the step 404 before completion of the second application process, the second application process for the current partial string is continued. On the other hand, when the execution of the second application process is interrupted at the step 405, the execution is resumed in advance of initiation of execution of the second application process for the next partial string.

The foregoing process for the meaning expressions are repeatedly performed until the final partial string is processed (step 406).

In the application executing portion 50 in the modified embodiment, a process to be performed in a relatively short period, such as storing of the value input by the voice for example, is executed as the first application process. On the other hand, a process which takes a relatively long period, such as accessing of a database, with respect to the meaning expression input by voice, is executed as the second application process. Then, when an interval between the meaning expressions output from the input dividing portion 40 is relatively long, the second application process which requires relatively long period is executed. By this way, the recognition and understanding process and application process can be performed simultaneously with speech of the user.

FIG. 5 is a timing chart showing concrete operation of the modified process. In FIG. 5, upon completion of first application process for the voice input "reserved seat", the application executing portion 50 does not receive the next meaning expression. Therefore, for the meaning expression "reserved seat", the second application process is performed.

On the other hand, during execution of the first application process for "two for each of adults and children", the application executing portion 50 already receives the next meaning expression. Therefore, the second application process for the meaning expression "two for each of adults and children" is not executed.

Also, upon completion of the first application process for the meaning expression "no-smoking seat", a next meaning expression is not yet received. Therefore, the second application process for the meaning expression "no-smoking" is initiated. However, during execution of the second application process for the meaning expression "no-smoking", the meaning expression "please" is received in the application executing portion 50. Then, the second application process for the meaning expression "no-smoking" is interrupted for executing the first application process for the next meaning expression "please". The second application process for the meaning expression "no-smoking" which is once interrupted is resumed in advance of execution of the second application process for the meaning expression "please".

Figure 6:
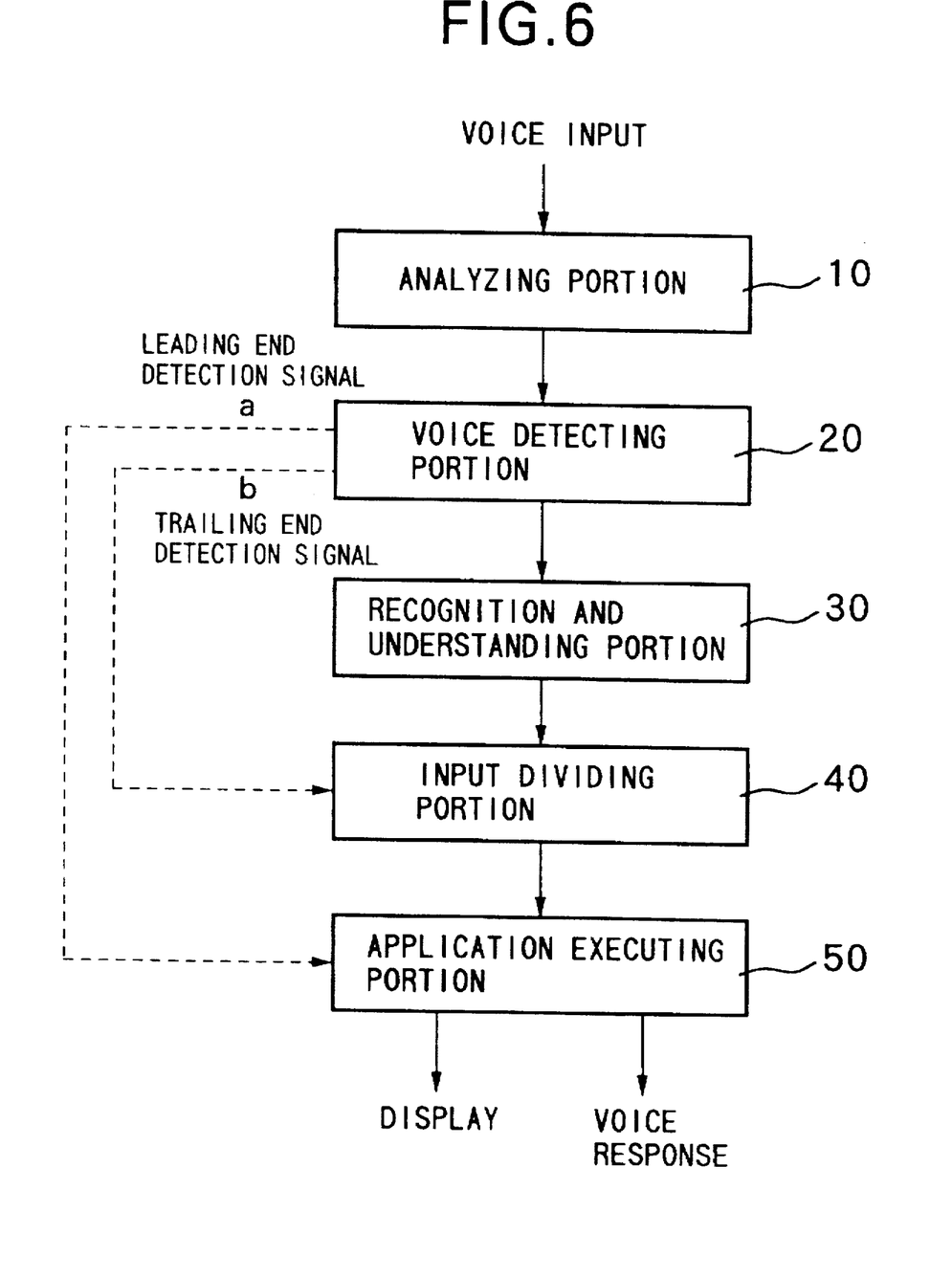
FIG. 6 is a block diagram showing a construction of another preferred embodiment of a speech dialogues system according to the present invention.
Figure 7:
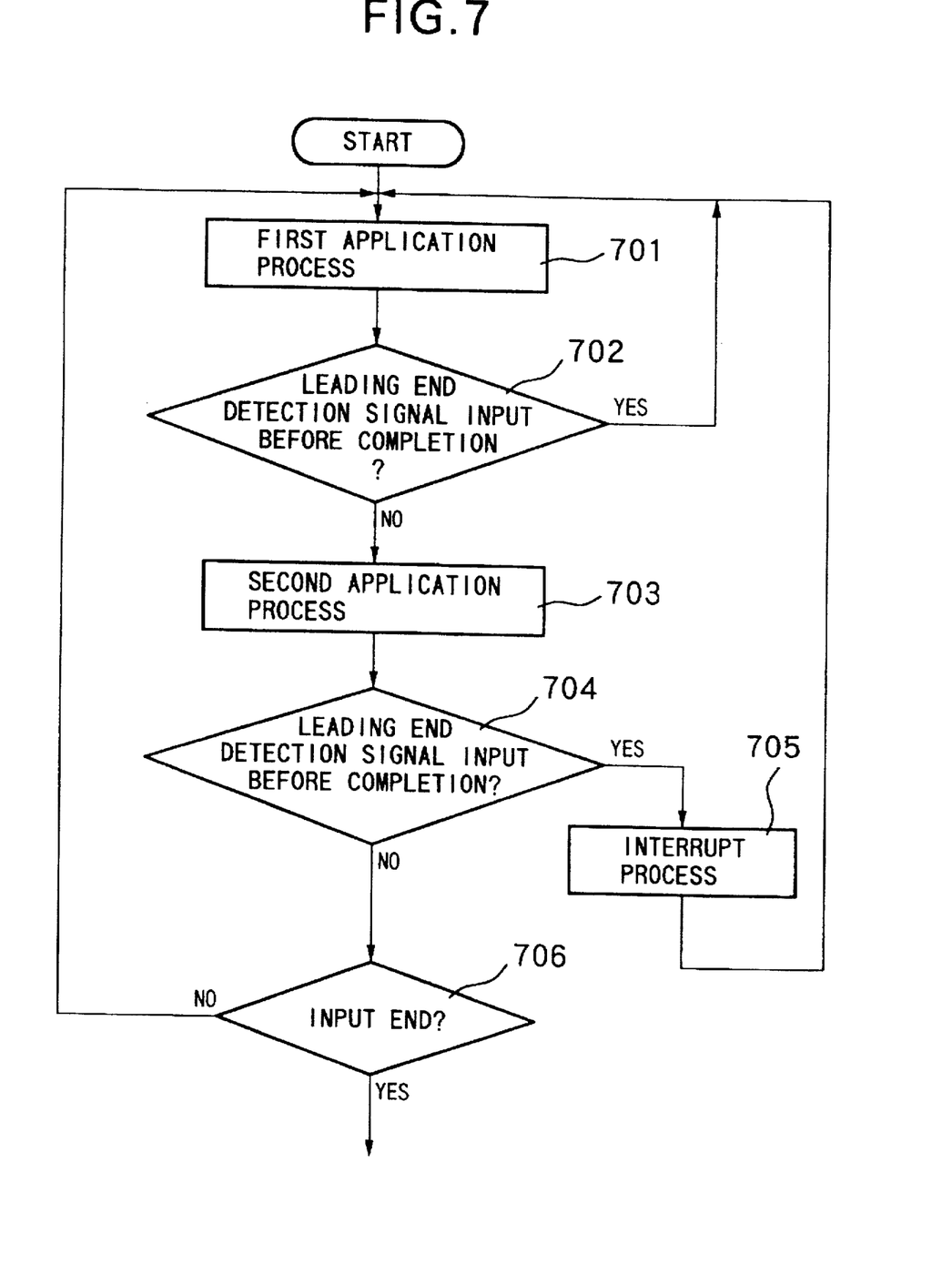
FIG. 7 is a flowchart showing the operation of another preferred embodiment of the speech dialogues system of FIG. 6.
Figure 8:
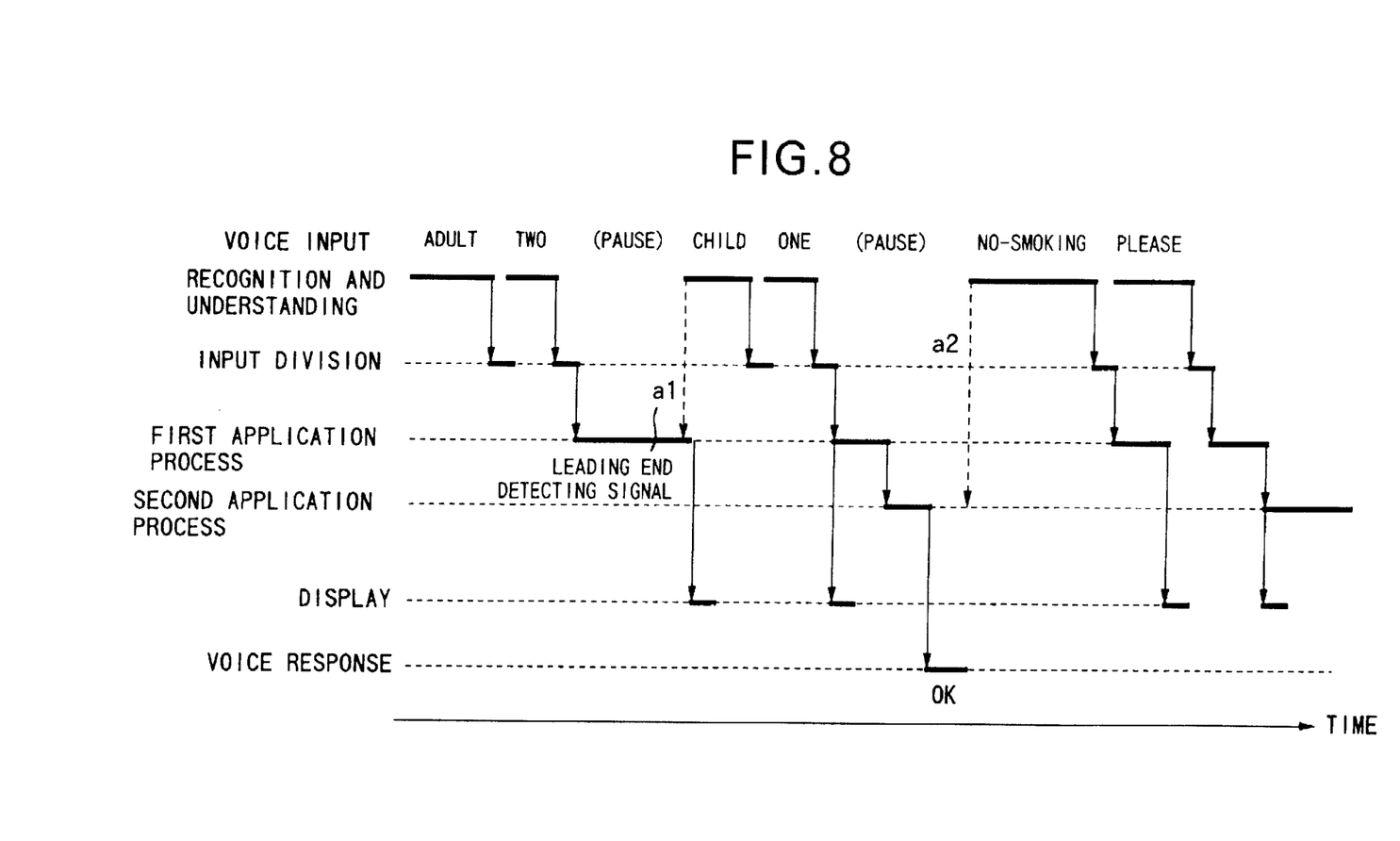
FIG. 8 is a timing chart showing the operation of an application executing portion of another preferred embodiment of the speech dialogues system of FIG. 6.

FIGS. 6 to 8 shows another preferred embodiment of the speech dialogues system according to the present invention. As shown in FIG. 6, at the time where the voice detecting portion 20 detects the leading end of the voice period in the input signal, a leading end detection signal a is output to the application executing portion 50. The application executing portion 50 is responsive to the leading end detection signal to interrupt the second application process for the currently executed meaning expression or to prevent the second application process from being initiated.

The operation of the application processing portion 50 in the shown embodiment of the speech dialogues system according to the invention will be discussed with reference to the flowchart in FIG. 7. Initially, with respect to the partial string of the meaning expression fed from the input dividing portion 40, the first application process is performed (step 701). Before completion of execution of the first application process, the application executing portion 50 makes a judgement as to whether the leading end detection signal a is received from the voice detecting portion 20 (step 702). If the leading end detection signal a is received, the second application process for the currently executed partial string is not performed and the first application process is executed for the next partial string.

When the leading end detection signal a is not input and is not received as checked at the step 702 before completion of the current execution of the first application process, the second application process is executed for the currently processed partial string (step 703). Before completion of the second application process for the current partial string, a check is performed as to whether the leading end detection signal a is received from the voice detecting portion 20 (step 704). If the leading end detection signal a is received, the execution of the second application process is interrupted (step 705), and the first application process is instantly executed. When the leading end detection signal is not input from the voice detecting portion 20 as checked at the step 704 before completion of the second application process, the second application process for the current partial string is continued. On the other hand, when the leading end detection signal is received during execution of the second application process, the execution of the second application process is resumed in advance of initiation of execution of the second application process for the next partial string.

As a result, when the user makes voice input with inserting a pause between the words, the recognition and understanding process, application process and response can be done simultaneously with the user's speech. Also, while the user interrupt speech, the second application process, such as voice response or other processes require relatively long period can be performed. By this, voice input will never be interrupted by execution of the second application process during the interval of the voice input. Therefore, the user will never be interrupted from his or her consideration of the speech on the display and the voice input.

FIG. 8 shows a timing chart of the concrete example of the embodiment of FIG. 6. During execution of the first application process for the meaning message "two adult tickets", the next leading end detection signal al for the next voice input is received, and the second application process for the partial string of "for two adults" will not be executed.

At a timing where the first application process for "for one child" is completed, the leading end detection signal al is not yet received. Therefore, the meaning expression "for one child", the second application process is executed. Here, as the result of the second application process, the voice response for encouraging voice input for the user or so forth may be output. With this, upon voice input by the user, depending upon the length of interval inserted between the clauses, application process and responding process in the application executing portion 50 is controlled so that the recognition and understanding process, the application process and response can be done simultaneously with the speech of the user so as to improve or enhance conversation ability.

Figure 9:
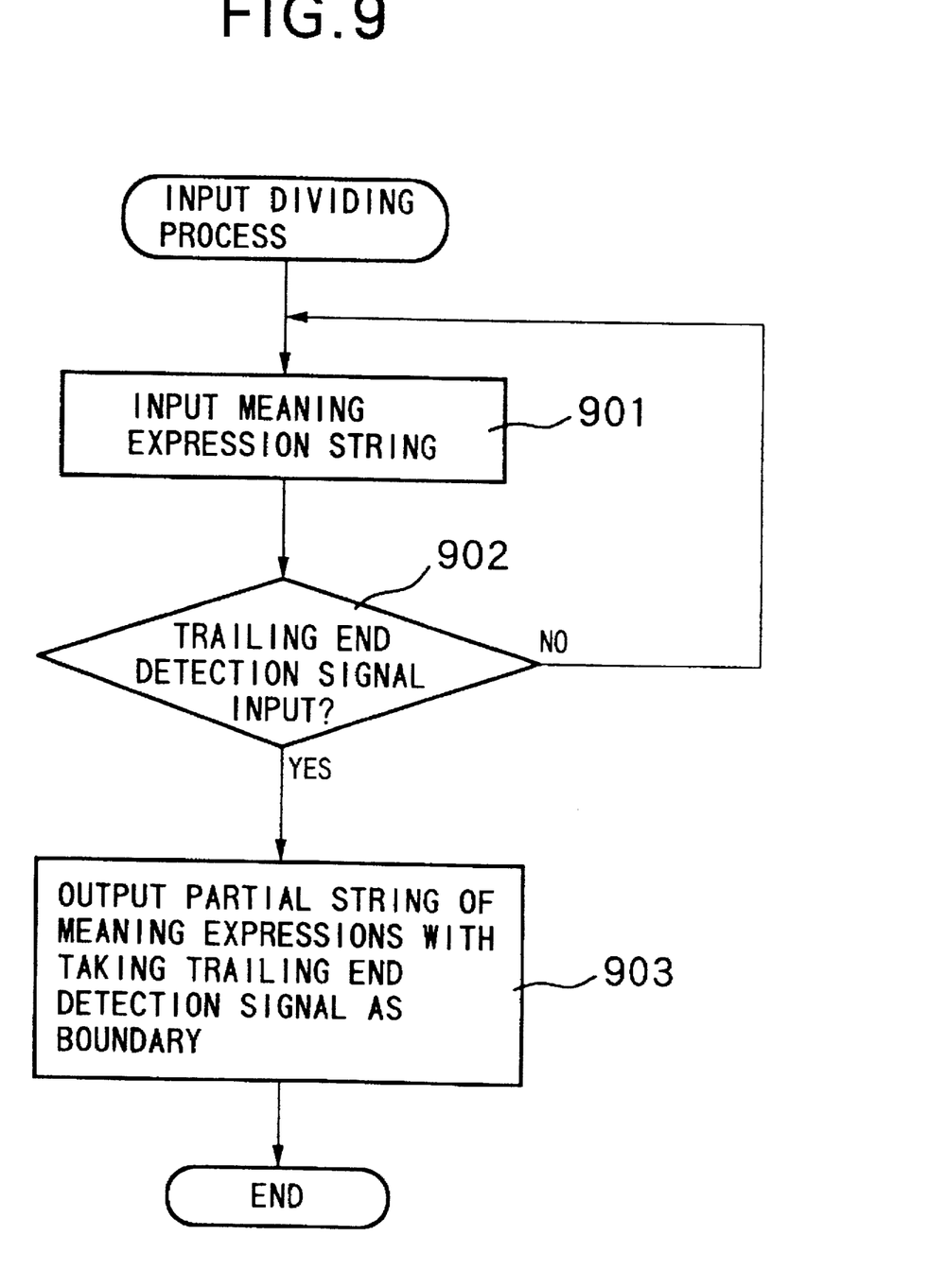
FIG. 9 is a flowchart showing an alternative of the operation of another preferred embodiment of the speech dialogues system of FIG. 6.

FIG. 9 shows a modification of the preferred process employed in another embodiment of the present invention. As indicated in FIG. 8, in the shown embodiment, the voice detecting portion 20 outputs a trailing end detection signal b. The input dividing portion 40 obtains the partial string of the meaning expression associated with or to be grouped in the meaning expression.

When the user makes voice input with consideration of the content of speech, for example, it often occurs that the user makes the voice input "two for adults (pause), one for child (pause) for no-smoking seat please". Namely, it is highly possible that the position of (pause) corresponds to a separation point of the meaning expression being divided.

While paying attention to the problem set out above, the shown embodiment permits effectively generate the partial string, in which one or more meaning expression are aggregated in the meaning.

FIG. 9 shows a flowchart of a modified process of the preferred process illustrated in FIG. 7, in which is shown the operation of the input dividing portion 40. Initially, when the meaning expression is input to the input dividing portion 40 from the voice detecting portion 20 (step 901), the input dividing portion 40 checks whether the trailing end detection signal b is input from the voice detecting portion 20 (step 902). If the trailing end detection signal b is not input, the subsequent meaning expression is continuously received by the input dividing portion 40. Upon reception of the trailing edge detection signal b, the meaning expressions received before input of the trailing edge detection signal, are output as one partial string (step 903).

Namely, the input dividing portion 40 is not required to preliminarily set the information concerning combination of the meaning expression by outputting the partial string aggregated in the meaning to facilitate separation of the partial string aggregated in the meaning. As a result of this, the input dividing portion can perform output process of the partial string as the aggregate of the meaning expressions associated in the meaning. This contributes permission for executing the application process simultaneously with voice input by the user.

Figure 10:
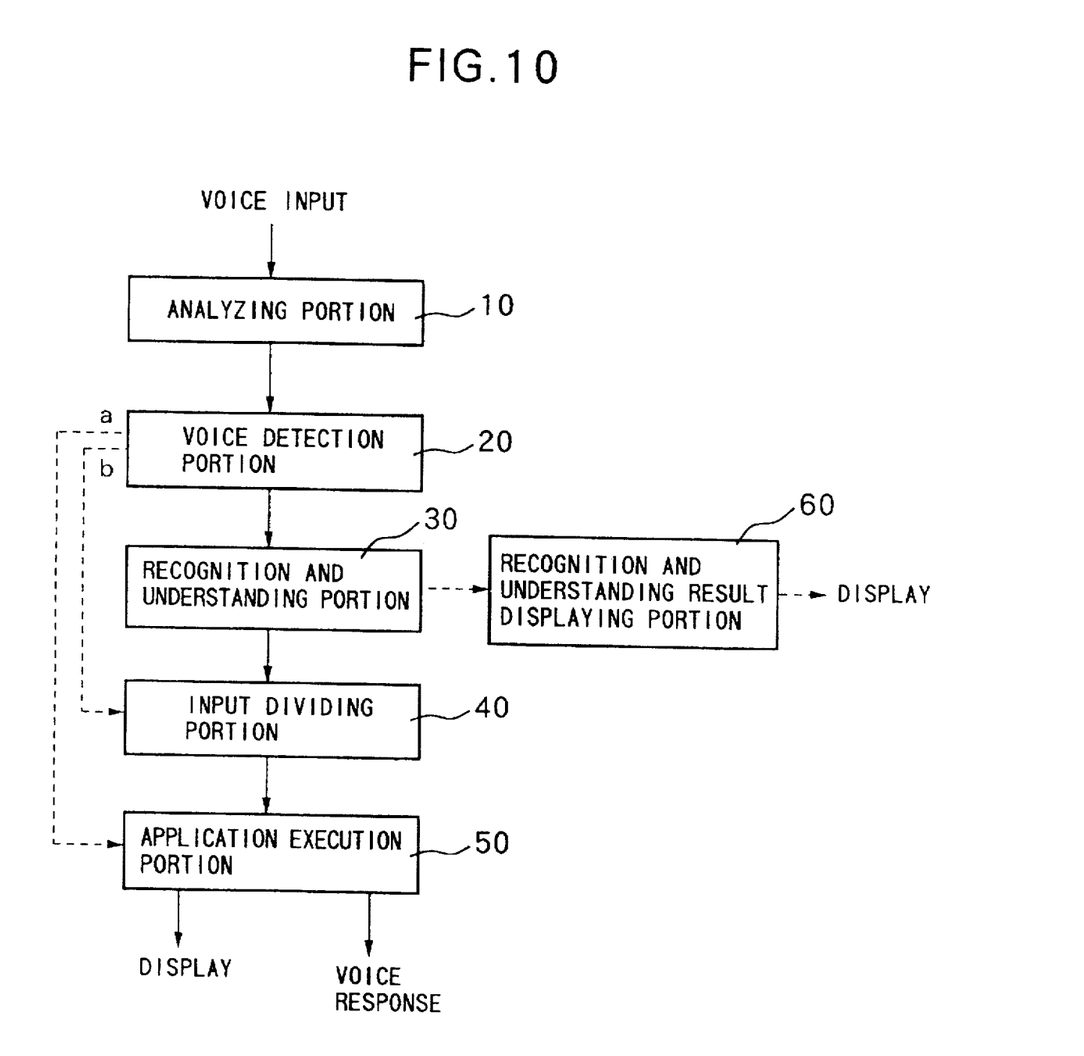
FIG. 10 is a block diagram showing a construction of a further preferred embodiment of a speech dialogues system according to the present invention.

FIG. 10 shows a further embodiment of the speech dialogues system according to the present invention. In the shown embodiment, a recognition and understanding result display portion 60 for displaying a string of the meaning expression output from the recognition and understanding portion 30 is provided. By this, in conjunction with conversion of the voice input into the meaning expression by the recognition and understanding portion 30, the content of the meaning expression is displayed on the recognition and understanding result display portion 60. By this, the user may know whether the input voice is correctly recognized or not, in parallel to the voice input. Accordingly, in advance of performing the process in the input dividing portion 40 and the application executing portion 50, the user may be made aware of an error in recognition of the voice input so that he may interrupt speech or reinput speech.

As set forth above, according to the present invention, since the recognition and understanding process, application process and response can be done simultaneously with user's speech, conversational capability between the user and system can be enhanced. Also, by performing the process requiring a relatively long period, such as accessing to the database or voice response while the user interrupts (pause) speech, the user does not have to interrupt his or her voice input so that voice input and application process can be done smoothly.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed and equivalents thereof with respect to the feature set out in the appended claims.

What is claimed is:

1. A speech dialogues system comprising:

voice analyzing means for converting a voice input signal into a time series feature vector, the converting being done in synchronism with voice input;

voice detecting means for detecting a leading end and a trailing end of a voice period in said voice input signal on the basis of the time series feature vector, the detecting being done simultaneously with the voice input;

recognition and understanding means for translating the time series feature vector into a meaning expression for each voice period, and for outputting the meaning expression in time series simultaneously with the voice input;

input dividing means for dividing said meaning expression into partial strings respectively aggregated in meaning and for outputting each of said partial strings simultaneously with the voice input; and application executing means for performing a corresponding application process for each of said partial strings of said meaning expression simultaneously with the voice input, the corresponding application process being based on the corresponding meaning of said each of said partial string.

2. A speech dialogues system as set forth in claim 1, wherein said application executing means has mutually distinct first and second processes for mutually different process content with respect to the partial strings of the meaning expression input from said input dividing means;

wherein said application executing means is responsive to each of said partial strings of said meaning expression to execute said first process for on one received partial string of the meaning expression;

wherein when a next partial string of the meaning expression is not input upon completion of said first process, said application executing means executes said second process for a currently processed partial string; and wherein, when the next partial string of said meaning expression is input during execution of said second process, said application executing means interrupts execution of said second process and executes said first process for the next partial string.

3. A speech dialogues system as set forth in claim 2, wherein said first process has a relatively short process period and wherein said second process has a relatively long process period.

4. A speech dialogues system as set forth in claim 2, wherein said first process has a relatively short process period and wherein said second process has a relatively long process period.

5. A speech dialogues system as set forth in claim 1, which further comprises recognition and understanding result display means receiving said meaning expression in time series and displaying the received meaning expression periodically.

6. A speech dialogues system as set forth in claim 1, wherein the recognition and understanding means performs the translating of the time series feature vector into a meaning expression for each of said voice periods only upon receipt of a leading end signal output by the voice detecting means which indicates the leading end of a corresponding voice period.

7. The speech dialogues system as set forth in claim 1, wherein the voice analyzing means performs converting of the voice input signal which corresponds to a current portion of the voice input, the voice detecting means simultaneously performs detecting of the leading edge and the trailing edge of the voice period of said voice input signal that corresponds to a first previous portion of the voice input, the recognition and understanding means simultaneously performs translating of the time series feature vector that corresponds to a second previous portion of the voice input, the input dividing means simultaneously performs dividing of the time series meaning expression that corresponds to a third previous portion of the voice input, and the application executing means simultaneously performs the corresponding application process for a fourth previous portion of the voice input, and wherein the first previous portion is later in time than the second previous portion, the second previous portion is later in time than the third previous portion, and the third previous portion is later in time than the fourth previous portion.

8. A speech dialogues system comprising:

voice analyzing means for converting a voice input signal into a time series feature vector, the converting being done in synchronism with voice input;

voice detecting means for detecting a leading end and a trailing end of a voice period in said voice input signal on the basis of the time series feature vector, the detecting being done simultaneously with the voice input;

recognition and understanding means for translating the time series feature vector into a meaning expression for each voice period, and for outputting the meaning expression in time series simultaneously with the voice input;

input dividing means for dividing said meaning expression into partial strings respectively aggregated in meaning and for outputting each of said partial strings simultaneously with the voice input; and application executing means for performing a corresponding application process for each of said partial strings of said meaning expression simultaneously with the voice input, the corresponding application process being based on the corresponding meaning of said each of said partial strings.

said voice detecting means outputting a leading end detection signal to said application executing means when the leading end of said voice period is detected;

said application executing means having mutually distinct first and second processes for mutually different process content with respect to the partial strings of the meaning expression input from said input dividing means, said application executing means being responsive to said leading end detection signal input during execution of said first process for a currently processed partial string; and when the leading end detection signal is input during execution of said second process, said application executing means interrupts execution of said second process and executes said first process for a next one of the partial strings.

9. A speech dialogues system as set forth in claim 6, which further comprises recognition and understanding result display means receiving said meaning expression in time series and displaying the received meaning expression periodically.

10. A speech dialogues system comprising:

voice analyzing means for converting a voice input signal into a time series feature vector, the converting being done in synchronism with voice input;

voice detecting means for detecting a leading end and a trailing end of a voice period in said voice input signal on the basis of the time series feature vector, the detecting being done simultaneously with the voice input;

recognition and understanding means for translating the time series feature vector into a meaning expression for each voice period, and for outputting the meaning expression in time series simultaneously with the voice input;

input dividing means for dividing said meaning expression into partial strings respectively aggregated in meaning and for outputting each of said partial strings simultaneously with the voice input; and application executing means for performing a corresponding application process for each of said partial strings of said meaning expression simultaneously with the voice input, the corresponding application process being based on the corresponding meaning of said each of said partial strings, said voice detection signal outputting a trailing end detection signal to said input dividing means when the trailing end of said voice period is detected; and said input dividing means outputting said meaning expression for said each voice period accumulated before input of said trailing end detection signal upon reception of said trailing end detection signal as the partial strings aggregated in meaning.

11. A speech dialogues system as set forth in claim 10, wherein said application executing means has mutually distinct first and second processes for mutually different process content with respect to the partial strings of the meaning expression input from said input dividing means;

said application executing means is responsive to each of said partial strings of said meaning expression to execute said first process for one received partial string of the meaning expression;

when a next partial string of the meaning expression is not input upon completion of said first process, said application executing means executes said second process for a currently processed partial string;

when the next partial string of said meaning expression is input during execution of said second process, said application executing means interrupts execution of said second process and executes said first process for the next partial string.

12. A speech dialogues system as set forth in claim 9, which further comprises recognition and understanding result display means receiving said meaning expression in time series and displaying the received meaning expression periodically.

13. A speech dialogeustic processing method comprising the steps of:

converting a voice input signal into a time series feature vector, the converting being done in synchronism with voice input;

detecting a leading end and a trailing end of a voice period in said voice input signal on the basis of the time series feature vector, the detecting being done simultaneously with the voice input;

translating the time series feature vector into a meaning expression for each voice period and outputting the meaning expression in time series simultaneously with the voice input;

dividing said meaning expression into partial strings respectively aggregated in meaning and outputting each of said partial strings simultaneously with the voice input; and performing a corresponding application process for each of said partial strings of said meaning expression simultaneously with the voice input, the corresponding application process being based on the corresponding meaning of said each of said partial strings.

14. A speech dialogues system as set forth in claim 13, wherein said step of performing application process includes mutually distinct first and second processes for mutually different process content with respect to the partial strings of the meaning expression input;

said application executing step is responsive to each of said partial strings of said meaning expression to execute said first process for one received partial string of the meaning expression;

when a next partial string of the meaning expression is not input upon completion of said first process, said application executing step executes said second process for a currently processed partial string;

when the next partial string of said meaning expression is input during execution of said second process, said application executing step interrupts execution of said second process and executes said first process for the next partial string.

15. A speech dialogeustic processing method comprising the steps of:

converting a voice input signal into a time series feature vector, the converting being done in synchronism with the voice detecting a leading end and a trailing end of a voice period in said voice input signal on the basis of the time series feature vector, the detecting being done simultaneous with the voice input;

translating the time series feature vector into a meaning expression for each voice period and outputting the meaning expression in the series simultaneously with the voice input;

dividing said meaning expression into partial strings respectively aggregated in meaning and outputting each of said partial strings simultaneously with the voice input;

performing a corresponding application process for each of said partial strings of said meaning expression simultaneously with the voice input the corresponding application process being based on the corresponding means of said each of said partial strings;

outputting a leading end detection signal to said application executing means when the leading end of each of said voice periods is detected; and said application executing step having mutually distinct first and second processes for mutually different process content with respect to the partial strings of the meaning expression input from said input dividing means, said application executing step is responsive to said leading end detection signal input during execution of said first process for a currently processed partial string; and when the leading end detection signal is input during execution of said second process, said application executing means interrupts execution of said second process and executes said first process for a next partial string.

16. A speech dialogeustic processing method as set forth in claim 15, which further comprises the steps of:

outputting a trailing end detection signal upon detection of the trailing end of each of said voice periods; and outputting said meaning expression for said each voice period accumulated before inputting of said trailing end detection signal as said partial string aggregated in the meaning when said trailing end detection signal of said each of said voice periods is input.

* * * * *